United States Patent Office 2,803,615
Patented Aug. 20, 1957

2,803,615

FLUOROCARBON ACRYLATE AND METHACRYLATE ESTERS AND POLYMERS

Arthur H. Ahlbrecht, White Bear Township, Ramsey County, Harvey A. Brown, Oakdale Township, Washington County, and Samuel Smith, Mendota Township, Dakota County, Minn., assignors to Minnesota Mining & Manufacturing Company, St. Paul, Minn., a corporation of Delaware No Drawing. Application January 23, 1956, Serial No. 560,900

16 Claims. (Cl. 260—29.6)

This invention relates to our discovery of novel polyacrylate and polymethacrylate fluorocarbon polymers useful for sizing fabrics to impart both repellency to water and resistance to absorption and soiling by oily and greasy materials, and for other purposes. The invention includes fabrics and other articles that have been sized or coated with these polymers. The invention also includes the monomeric fluorocarbon acrylate and methacrylate esters, which are useful for making said polymers and for other purposes.

More particularly, these novel monomer compounds are the acrylate esters and methacrylate esters of perfluoroalkanesulfonamido alkanols that have in the molecule a perfluorocarbon "tail" containing 4 to 12 fully fluorinated carbon atoms. The parent alcohols may be referred to as N-alkyl, N-alkanol perfluoroalkanesulfonamides and are represented by the equivalent formulas:

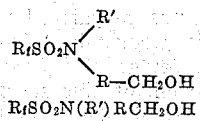

$$R_fSO_2N(R')RCH_2OH$$

wherein $R_f$ is a perfluoroalkyl group containing 4 to 12 carbon atoms (which provides the perfluorocarbon "tail"), R is an alkylene bridging group containing 1 to 12 carbon atoms, and R' is a short-chain alkyl side group containing 1 to 6 carbon atoms (methyl, ethyl, propyl, butyl, amyl or hexyl). The corresponding acrylate esters have the equivalent formulas:

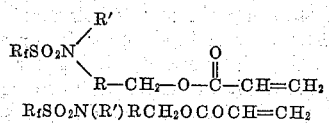

$$R_fSO_2N(R')RCH_2OCOCH=CH_2$$

and the corresponding methacrylate esters have the equivalent formulas:

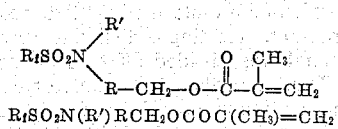

$$R_fSO_2N(R')RCH_2OCOC(CH_3)=CH_2$$

These esters can be employed as intermediates for making derivatives. In particular, the reactive olefinic terminal group can be availed of in making derivatives as is well understood.

The esters readily polymerize inter se to form novel fluorocarbon polyacrylate and polymethacrylate homopolymers in which the skeletal chain of the polymer molecule is provided with fluorocarbon ester side chains which have a perfluorocarbon "tail" ($R_f$) containing from 4 to 12 fully fluorinated carbon atoms. The structure of the acrylate polymer molecule is indicated by the following formula of the recurring ester unit:

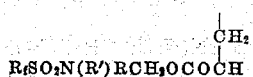

and that of the methacrylate polymer molecule by the following formula of the recurring ester unit:

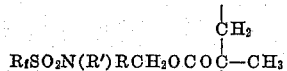

These recurring ester units of the polymer molecule can be represented generically by the formula:

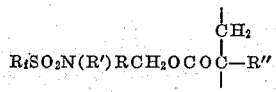

where R" is a hydrogen atom (acrylate polymers) or a methyl group (methacrylate polymers).

Bulk, solution and emulsion polymerization procedures can be used, employing peroxide and persulfate catalysts.

The fully polymerized homopolymers include clear, colorless, water-repellent and oil-repellent, thermoplastic solids which are flexible and more or less rubbery, and which are insoluble in hydrocarbons and other common organic solvents and are resistant to swelling therein. They are highly insoluble in water and resistant to swelling therein. They are soluble in fluorinated solvents, such as fluorocarbon acids and esters, benzotrifluoride, and xylene hexafluoride.

Coatings of the solid polymers can be applied from solution or emulsion to provide firmly bonded surface coatings or sizings on textile fibers (natural or synthetic), yarns, cloths and other fabrics, and on paper, cellulosic films, leather, lithic materials, glass and ceramic articles and metals. Due to orientation of the polymer molecules, the fluorocarbon "tails" provide an inert fluorocarbon-like outer surface which is both hydrophobic and oleophobic. Drops of water and drops of oil deposited on the surface will remain or run off rather than spreading and wetting the surface.

The treatment of textile fabrics, for example, can be conducted so that the treated fabric has an imperceptible sizing coating on the fibers which does not materially affect porosity, flexibility, feel and hand, strength, appearance or color. The sizing is tightly bonded to the fibers. The fabric can be subjected to repeated launderings or dry cleanings without losing its water and oil resistance. This makes possible the production of fabrics which are resistant to absorption and staining not only by water and aqueous materials, but also by oily and greasy materials. Such materials are not absorbed and can be wiped off or readily removed by laundering or dry cleaning. Illustrative applications are the treatment of fabrics utilized in automobile upholstery, work clothes, sport clothes, coats and jackets, and rugs and carpets, which are particularly subject to soiling by oily or greasy materials, so that resistance to such soiling combined with water-resistance is highly desirable.

In addition to homopolymers of the aforesaid acrylate and methacrylate esters, novel copolymers (heteropolymers) can be made by interpolymerizing the present ester monomers with polymerizable monomers of other kinds which contain an ethylenic linkage. Examples of the latter are maleic anhydride, acrylonitrile, vinyl acetate, vinyl chloride, vinyl silicones, styrene, methyl acrylate, methyl methacrylate, ethylene, isoprene and butadiene; both as to non-halogenated and halogenated varieties. The present monomers readily copolymerize with such comonomers, the presence of the fluorocarbon "tail" in the molecular structure of the present monomers having been found not to interfere. This makes possible the production of many types of polymers having different physical properties, wherein the polymer molecules include fluorocarbon ester units providing perfluorocarbon side-chain "tails" of the type mentioned above.

The properties of the polymer masses can also be varied by the use of plasticizers (such as fluorocarbon esters), and by compounding with carbon black and other finely divided solid materials such as zinc oxide. The stiffness or hardness of the polymer mass can be increased by including a small amount of a polyfunctional cross-linking agent at the time of polymerization to cause crosslinking between the skeletal chains and thereby form a three-dimensional network. Vulcanization procedures can be employed. The use of various expedients for modifying the properties of polymer masses is understood by those skilled in polymer chemistry and need not be elaborated upon.

The fundamental contribution of the present invention is the discovery of the aforesaid novel fluorocarbon acrylate and methacrylate esters and their utility as polymerizable monomers for making novel and useful polymers, and in particular their utility for making polymers useful for sizing fabrics to impart both water-repellency and resistance to oily and greasy materials.

It is of critical importance that the perfluorocarbon "tail" contain at least four carbon atoms, and the preferred number is six to ten. A terminal chain of this minimum length is required in order to insolubilize and render both hydrophobic and oleophobic the perfluoroalkanesulfonamido end of the ester molecules and the corresponding end of the side-chain ester units incorporated in the polymers made therefrom. Increase in length of this "tail" decreases solubility still further and enhances the degree of water and oil repellency imparted to polymers of the present acrylate and methacrylate esters.

The length of the bridging alkylene group, represented by —R— in the preceding ester formulas, can be varied to thereby modify solubility and surface properties of the esters and their polymers, as well as other physical properties of the polymers such as melting point, flexibility and rubberiness. The N-substituted alkyl side group can also be varied to modify properties. Choice can be made between the acrylate and methacrylate types of polymers, as well as copolymers of the present acrylate and methacrylate esters in varying proportions. The acrylate polymers are softer and more rubber than the methacrylate polymers, and copolymers have intermediate properties.

Thus the general molecular structure of the present acrylate and methacrylate esters and polymers can be varied to obtain specifically different characteristics, so that monomers and polymers having optimum properties for a given end use can be selected.

The perfluoroalkanesulfonamido alkanol starting compounds which are esterified to produce the present acrylate and methacrylate esters, can be readily prepared in good yields by the reaction of a halohydrin with a sodium or potassium salt of the corresponding perfluoroalkanesulfonamide:

$$R_fSO_2N(R')A + XRCH_2OH \rightarrow R_fSO_2N(R')RCH_2OH$$

where A is a sodium or potassium, X is chlorine or bromine, and $R_f$, R and R' have the meanings previously stated. Instead of employing a halohydrin, use may be made of the corresponding acetate ester thereof. These alkanol compounds are described and claimed in the companion application of two of us, A. H. Ahlbrecht and H. A. Brown, filed of even date herewith, S. N. 560,899. The aforesaid perfluoroalkanesulfonamide starting compounds can be readily prepared from corresponding perfluoroalkanesulfonyl fluorides ($R_fSO_2F$) as described in the copending application of T. J. Brice and P. W. Trott, S. N. 448,784, since issued as U. S. Patent No. 2,732,398 on January 24, 1956.

*Example 1*

This example provides a detailed description of the preparation of the presently preferred acrylate polymer employed for sizing cloth, namely, the homopolymer of the acrylate ester of N-propyl, N-ethanol perfluorooctanesulfonamide:

$$C_8F_{17}SO_2N(C_3H_7)CH_2CH_2OCOCH=CH_2$$

The description includes the preparation of the acrylate ester monomer and is prefaced by a description of the preparation on a substantial scale of the starting alcohol, which is derived from perfluorooctanesulfonyl fluoride, $C_8F_{17}SO_2F$. The latter had been purified by washing twice with pyridine, followed by a dilute hydrochloric acid wash and a water wash, drying over magnesium sulfate, treating with decolorizing activated carbon, and filtering.

A 22 liter Pyrex glass flask equipped with a thermometer, stirrer and distilling head, was successively charged with 7,200 grams of isopropyl ether, 1,600 grams (27 moles) of n-propylamine, and then with 4,544 grams (9.05 moles) of the purified sulfonyl fluoride starting compound which was added over a period of 1½ hours with constant stirring to maintain the temperature at 25–30° C. The reaction mixture was stirred for 3 hours at 30° C. and for 2 hours at 40° C. After cooling to room temperature, the mixture was washed with 4,500 grams of 9% aqueous hydrochloric acid solution. The phases separated upon standing and the lower (aqueous) layer was siphoned off. The product layer was rewashed with 4,500 grams of an aqueous solution containing 4.5% hydrochloric acid and 4% ferrous sulfate, and the aqueous phase was removed. The reaction flask was fitted with a distilling head, and the ether was removed by distillation under reduced pressure at a water bath temperature of 70–80° C., yielding 4,648 grams of N-propyl perfluorooctanesulfonamide:

$$C_8F_{17}SO_2N(C_3H_7)H$$

The sodium salt was prepared by dissolving 4,608 grams of this amide product in 4,600 ml. of absolute methanol, adding 474 grams of sodium methoxide ($CH_3ONa$) in 2,300 ml. of absolute methanol, and removing the alcohol by distillation of the reaction mixture under reduced pressure at a bath temperature of 70°–80° C. The yield of dry salt product was 4,842 grams.

A 12 liter Pyrex glass flask equipped with a thermometer, stirrer and distilling head, was charged with 4,797 grams of the aforesaid dry sodium salt and 741 grams of ethylene chlorohydrin ($ClCH_2CH_2OH$) was added, the mole ratio of chlorohydrin to salt being 1:1 to 1. The mixture was heated until liquid enough for stirring and was then heated with constant stirring for 5 hours at 110–115° C. A sample of the reaction product was withdrawn and titrated for free sulfonamide and salt content, showing that 10.1% amide and 5.3% salt remained unreacted. Addition was made of 60.5 grams of sodium methoxide in 300 ml. of absolute methanol to neutralize the sulfonamide present. Heating and stirring were continued and the methanol was distilled off to a pot temperature of 120° C. Then a further 188 grams of chlorohydrin was added and heating was continued for 6 hours at 115° C. The reaction mixture was cooled to 40° C. and 7,200 ml. of diethyl ether and 220 grams of decolorizing activated carbon were added. The mixture was stirred and heated at reflux for one-half hour, cooled to room temperature, and filtered with suction. The filtrate was charged to a separatory flask fitted with a bottom take-off and washed successively with 2,800 ml. of water, 2,800 ml. of aqueous 5% sodium hydroxide solution, and 2,800 ml. of water. The washed ether solution was returned to the reaction flask, which was fitted with a distilling head, and the ether was distilled off under reduced pressure, yielding 4,090 grams of product, identified as relatively pure N-propyl, N-ethanol perfluorooctanesulfonamide:

$$C_8F_{17}SO_2N(C_3H_7)CH_2CH_2OH$$

Analysis indicated that the product contained 4.5% unreacted amide and 1% unreacted amide salt. This alkanol product is a light-tan waxy solid material having a vacuum boiling point of 120–126° C. at 0.5 mm. and a melting point of 48–55° C.

A 12 liter Pyrex glass flask equipped with a thermometer, stirrer, and two Barrett traps fitted with water-cooled reflux condensers (to serve as azeotrope separators), was charged with 3,960 grams of the aforesaid alkanol product (6.77 moles), 15 grams of copper flakes, 3,000 ml. of benzene, 580.5 grams of acrylic acid (8.2 moles), and 30 grams of concentrated sulfuric acid. The mixture was heated to reflux and over a period of 7½ hours a total of 125 ml. of water was recovered in the Barrett traps from the benzene azeotrope, which was approximately the theoretical amount. The solution was cooled to 20° C. and the excess acrylic acid and sulfuric acid were neutralized by addition of 300 grams of calcium hydroxide. Addition was made of 50 grams of decolorizing activated carbon and after stirring for half an hour the mixture was suction filtered through a Buchner funnel. The filtrate was then treated with 750 grams of cationic type ion exchange resin ("Amberlite" IRA 120) for 1½ hours to reduce the copper content, and was filtered. This filtrate was vacuum distilled at a pot temperature of 45–50° C. to remove the benzene, yielding 4,140 grams of acrylate ester product:

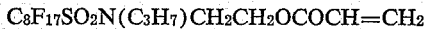
$$C_8F_{17}SO_2N(C_3H_7)CH_2CH_2OCOCH=CH_2$$

This ester monomer is a light-brown liquid material at room temperature, the coloration being due to impurities which can be removed to yield a colorless ester if desired.

Emulsion polymerization is illustrated by the following: The reaction vessel was a 5 liter 3-necked Pyrex glass flask equipped with an agitator, thermometer, reflux condenser and cold finger, and placed in a water bath. The flask was equipped for purging with oxygen-free nitrogen. The following recipe was employed:

| | Grams |
| --- | --- |
| Acrylate ester monomer | 1400 |
| Water (oxygen-free) | 1764 |
| Acetone (analytical grade) | 756 |
| Emulsifying agent | 70 |
| Catalyst ($K_2S_2O_8$) | 7 |

The emulsifying agent was the potassium salt of N-ethyl, N-perfluorooctanesulfonyl glycine, having the formula:

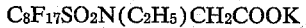
$$C_8F_{17}SO_2N(C_2H_5)CH_2COOK$$

This glycine acid and its salt are described in the copending application of one of us, H. A. Brown, Ser. No. 556,047, filed December 29, 1955, which may be consulted for details on its preparation as a derivative of perfluorooctanesulfonyl fluoride.

After purging the flask for 20 minutes with oxygen-free nitrogen, the water and the emulsifying agent were added and agitated for 20 minutes to insure complete solution. The acrylate ester and the acetone were added and the batch was agitated for 10 minutes and heated to 50° C. The catalyst was then added and agitation continued. (All additions were carried out under a nitrogen atmosphere and nitrogen flow was maintained during polymerization.) The onset of polymerization occurred promptly and little temperature increase was noted. The bath temperature was maintained at approximately 50° C. A conversion of 83% was reached in 90 minutes. The mixture was cooled to room temperature, decanted from the small amount of residue that had precoagulated, and filtered through cotton gauze.

The product was a stable aqueous latex dispersion of the desired homopolymer of the acrylate ester, containing 29.7% polymer solids.

The solid polymer can be recovered by coagulating with methanol or by freezing, washing and drying. It is a colorless plastic mass. It is insoluble in water and generally insoluble in non-fluorinated organic solvents. It is readily soluble at room temperature in such fluorinated solvents as xylene hexafluoride, benzotrifluoride, methyl perfluorobutyrate, trichlorofluoromethane ("Freon 11"), and 1,1,2-trichloro-1,2,2-trifluoroethane ("Freon 113"), etc. The polymer can be applied to surfaces from volatile solutions by means of an aerosol "bomb" or "spray-can" applicator. Coatings of the polymer are both water-repellent (hydrophobic) and oil-repellent (oleophobic).

A latex sizing solution was prepared by diluting the aforesaid aqueous latex dispersion of the acrylate polymer with water to a 1% (by weight) latex solids content. Samples of various cloths were dipped into the solution, passed between squeeze rolls to remove excess solution, and dried by heating at 140° C. for 10 minutes. Drops of water and drops of oil placed on the surface of the treated cloths in all cases remained indefinitely without spreading out and wetting the surface, demonstrating the hydrophobic and oleophobic properties of the polymer size on the fiber surfaces and the prevention of capillarity. The cloths tested included cotton jeans cloth, wool cloth, nylon cloth, and a cloth made from a blend of 55% "Dacron" fibers and 45% worsted (wool) fibers. ("Dacron" is the trademark of the Du Pont Company for drawn polyester fibers produced from a polyester of ethylene glycol and terephthalic acid.)

The high degree of water repellency imparted to the "Dacron"-worsted cloth was shown by a "Spray Test" (Standard Test Method No. 22–52 published in the 1952 Technical Manual and Yearbook of the American Association of Textile Chemists and Colorists, vol. XXVIII, page 136), which gave a rating of 100 on a 0–100 scale, and which was therefore the highest possible rating. It has been found that a severe test of oil repellency is to determine the resistance to penetration by solutions of mineral oil in heptane, which have a greater tendency to penetrate than does mineral oil alone. The higher the proportion of heptane the quicker the penetration. In the case of this treated cloth, it was found that resistance to penetration for at least 3 minutes was obtained with a white mineral oil ("Nujol") solution containing 50% (by volume) of heptane, which demonstrated excellent resistance to oil.

Water and oil base stains (e. g., from ink, soft drinks, coffee, salad oil, gravy, hair oil, etc.) could be removed from the treated fabrics by blotting and rubbing without leaving a mark. Yet the treatment did not adversely affect the hand, shade, strength or porosity of the fabric and was "invisible" in its effect except as to imparting a combined hydrophobic and oleophobic character.

The insolubility of the polymers in water, hydrocarbons and common organic solvents renders the cloth sizing highly resistant to removal when subjected to such materials, and permits of laundering and dry cleaning sized fabrics without destroying the effectiveness of the sizing.

A high degree of water and oil repellency was imparted to various porous papers that were dipped into the treating solution and dried.

*Example 2*

The acrylate ester of N-butyl, N-ethanol perfluorooctanesulfonamide:

$$C_8F_{17}SO_2N(C_4H_9)CH_2CH_2OCOCH=CH_2$$

was prepared by esterifying the corresponding alcohol with acrylic acid in the presence of p-toluenesulfonic acid and hydroquinone in benzene solvent; and the ester product was isolated.

A mixture of 50 grams of this acrylate ester, 27 grams of acetone, and an emulsifier solution containing 2.5 grams of the potassium salt of N-ethyl, N-perfluorooctanesulfonyl glycine in 63 grams of water, was charged into a 3-necked 250 ml. flask fitted with a reflux condenser, gas inlet tube, mechanical stirrer and thermometer. The flask was placed in a water bath maintained at 50° C. and the mixture was stirred vigorously for 30 minutes while a slow stream of pure (oxygen-free) nitrogen was passed through the flask to remove any oxygen present. Rapid polymerization started instantly when 0.25 gram of potassium persulfate was added at this point. No temperature rise was observed during the reaction period of 2½ hours. The product was a stable amber-colored aqueous latex dispersion containing 29% polymer by weight (81% conversion). The dry polymer was a flexible plastic mass and was found to be generally insoluble in non-fluorinated solvents. The polymer had an instrinsic viscosity of 0.32 as determined from the viscosity at 25° C. of a dilute solution in a solvent mixture of acetone and methyl perfluorobutyrate (1:2 ratio).

The sizing treatment of various fabrics and papers with the polymer gave results similar to those described in the preceding example, imparting a high degree of resistance to water and to oil and a highly hydrophobic and oleophobic surface.

*Example 3*

The methacrylate ester of N-ethyl, N-ethanol perfluorooctanesulfonamide:

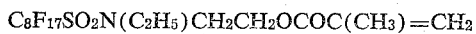
$C_8F_{17}SO_2N(C_2H_5)CH_2CH_2OCOC(CH_3)=CH_2$ was prepared by esterifying the corresponding alcohol with methyl methacrylate in the presence of p-toluenesulfonic acid and hydroquinone; and the ester product was isolated. Analysis showed 2.21% nitrogen (2.19% calc.) and the identification was confirmed by infrared analysis.

A heavy-walled Pyrex glass ampoule was charged with 2.44 grams of this methacrylate ester and 0.0244 gram of acetyl peroxide (as a 25% solution in dimethyl phthalate). To remove any oxygen in the ampoule the ester was melted, the ampoule and its contents were frozen in liquid air, and the ampoule was evacuated to a pressure of less than 0.01 mm. and sealed while frozen. The sealed ampoule was then warmed until the ester was melted, and placed in an end-over-end rotator in a water bath at 50° C. for 18 hours. The resulting reaction mixture was purified by dissolving it in xylene hexafluoride, reprecipitating in acetone, and drying down in a vacuum oven at room temperature. The yield of purified homopolymer was 1.78 grams (73% yield). It was a transparent colorless plastic having a softening point of about 70° C. Its intrinsic viscosity was 0.66 as determined from the viscosity at 25° C. of a dilute solution in xylene hexafluoride (0.021 part polymer per 100 parts solvent). This polymer is insoluble in water and in common organic solvents.

This methacrylate ester was also polymerized by an emulsion procedure similar to that described in Example 2, using methanol in place of acetone. A stable latex was obtained. The coagulated and dried homopolymer was a colorless plastic mass, which was both hydrophobic and oleophobic.

This polymer imparts a high degree of water and oil repellency when employed for sizing fabrics and papers.

*Example 4*

A flask equipped with a Barrett trap fitted with a water-cooled reflux condenser (to serve as an azeotrope separator) was charged with 31.3 grams of N-butyl, N-butanol perfluorooctanesulfonamide:

$C_8F_{17}SO_2N(C_4H_9)(CH_2)_4OH$ and with 10 grams of methacrylic acid, 0.5 gram of p-toluenesulfonic acid, 0.2 gram of hydroquinone, and 40 grams of benzene. The mixture was refluxed for 3 hours and the reaction was deemed complete as indicated by water collected in the trap. Benzene was removed by distillation until the pot temperature had reached 115° C. The residue was cooled and poured into ether. The ether solution was separated and washed with dilute aqueous sodium hydroxide and then with water. The ether was evaporated off at reduced pressure, yield 32 grams of a brown viscous liquid product, identified as the desired methacrylate ester:

$C_8F_{17}SO_2N(C_4H_9)(CH_2)_4OCOC(CH_3)=CH_2$

Emulsion polymerization yielded a colorless plastic homopolymer which was both hydrophobic and oleophobic, and which imparted a high degree of water and oil repellency when employed for sizing fabrics and papers.

*Example 5*

A flask equipped with a Barrett trap fitted with a water-cooled reflux condenser was charged with 14 grams of N-ethyl, N-undecanol perfluorooctanesulfonamide:

$C_8F_{17}SO_2N(C_2H_5)(CH_2)_{11}OH$ and with 2.8 grams of acrylic acid, 0.5 gram of p-toluenesulfonic acid, 0.3 gram of hydroquinone, and 40 grams of benzene. The mixture was refluxed for 4 hours and allowed to stand overnight. Benzene was removed by distillation until the pot temperature reached 100° C. The residue was cooled and 30 ml. of ether was added. The ether solution was separated and washed by dilute (2–3%) aqueous sodium hydroxide and then with water. The ether solution was dried with calcium hydroxide and was cooled to about minus 20° C. for 16 hours. No crystals were formed. The ether was evaporated, yielding 10 grams of the desired acrylate ester:

$C_8F_{17}SO_2N(C_2H_5)(CH_2)_{11}OCOCH=CH_2$

This product was a white solid having a melting point of 38–40° C. Analysis showed 43.0% fluorine (43.1% calc.) and 1.83% nitrogen (1.86% calc.). Identification was further confirmed by infrared analysis.

Emulsion polymerization resulted in a soft rubbery homopolymer which was both hydrophobic and oleophobic.

*Example 6*

Using a similar procedure, 58 grams of N-ethyl, N-ethanol perfluorohexanesulfonamide:

$C_6F_{13}SO_2N(C_2H_5)CH_2CH_2OH$ and 9.8 grams of acrylic acid were reacted, and 57 grams of the desired acrylate ester, having a vacuum boiling point of 105–110° C. at 0.06 mm., was isolated, namely:

$C_6F_{13}SO_2N(C_2H_5)CH_2CH_2OCOCH=CH_2$

Emulsion polymerization resulted in a soft, flexible plastic homopolymer which was both hydrophobic and oleophobic.

*Example 7*

Using a similar procedure, 20.5 grams of N-methyl, N-butanol perfluorobutanesulfonamide:

$C_4F_9SO_2(CH_3)(CH_2)_4OH$ and 7.2 grams of acrylic acid were reacted, and 16 grams of the desired acrylate ester was isolated, namely:

$C_4F_9SO_2N(CH_3)(CH_2)_4OCOCH=CH_2$

This ester product was a clear, viscous liquid at room temperature, having a melting point of 21–23° C. Heating with benzoyl peroxide catalyst in an oxygen-free sealed ampoule resulted in the formation of a sticky polymer product.

The following examples illustrate the ability of our acrylate and methacrylate ester monomers to copolymerize with other ethylenic monomers to provide heteropolymers.

*Example 8*

The following emulsion polymerization recipe was used in which the "Acrylate ester monomer" was the acrylate ester of N-ethyl, N-ethanol perfluorooctanesulfonamide:

$$C_8F_{17}SO_2N(C_2H_5)CH_2CH_2OCOCH=CH_2$$

and the "Emulsifying agent" was the same one that was described in connection with the polymerization recipe of "Example 1."

| | Grams |
|---|---|
| Acrylate ester monomer | 1.94 |
| Butadiene | 0.06 |
| Water | 2.52 |
| Acetone | 1.08 |
| Emulsifying agent | 0.10 |
| $K_2S_2O_8$ | 0.01 |

The acrylate:butadiene mole ratio is 75:25.

A glass ampoule was charged with all of the materials except the butadiene, frozen in liquid air, evacuated to less than 0.01 mm., thawed and refrozen, and re-evacuated. The butadiene was introduced through the vacuum system, and the ampoule was sealed. It was agitated in a 50° C. water bath for 16 hours, resulting in a 100% conversion to the polymer latex, which was cloudy and blue in appearance. The polymer was identified as the desired acrylate-butadiene copolymer. It had an intrinsic viscosity of 0.14 as determined from the viscosity of a dilute solution in a mixture of methyl perfluorobutyrate and acetone (2:1 ratio). The dry polymer was a colorless, somewhat flexible, plastic mass.

*Example 9*

The same procedure was used in making a latex copolymer of a methacrylate ester monomer and butadiene in 70:30 mole ratio, employing the methacrylate ester of N-ethyl, N-butanol perfluorooctanesulfonamide:

$$C_8F_{17}SO_2N(C_2H_5)(CH_2)_4OCOC(CH_3)=CH_2$$

and the following recipe:

| | Grams |
|---|---|
| Methacrylate ester monomer | 1.93 |
| Butadiene | 0.07 |
| Water | 2.52 |
| Acetone | 1.08 |
| Emulsifying agent | 0.10 |
| $K_2S_2O_8$ | 0.01 |

A 79% conversion to a cloudy blue latex was obtained. It contained a small amount of precoagulum. The intrinsic viscosity was 0.17. This methacrylate-butadiene copolymer in dry form was soft and tacky, as contrasted with the homopolymer of the methacrylate ester which is a brittle plastic.

We claim:

1. Fluorocarbon compounds of the class consisting of the acrylate esters and methacrylate esters of N-alkyl, N-alkanol perfluoroalkanesulfonamides which have in the molecule a perfluorocarbon "tail"; said acrylate esters having the formula:

$$R_fSO_2N(R')RCH_2OCOCH=CH_2$$

and said methacrylate esters having the formula:

$$R_fSO_2N(R')RCH_2OCOC(CH_3)=CH_2$$

wherein $R_f$ is a perfluoroalkyl group containing 4 to 12 carbon atoms, R is an alkylene bridging group containing 1 to 12 carbon atoms, and R' is an alkyl side group containing 1 to 6 carbon atoms.

2. The acrylate ester of N-propyl, N-ethanol perfluorooctanesulfonamide, having the formula:

$$C_8F_{17}SO_2N(C_3H_7)CH_2CH_2OCOCH=CH_2$$

3. The acrylate ester of N-butyl, N-ethanol perfluorooctanesulfonamide, having the formula:

$$C_8F_{17}SO_2N(C_4H_9)CH_2CH_2OCOCH=CH_2$$

4. Polymers having a skeletal chain containing fluorocarbon acrylate ester units indicated by the formula:

$$\begin{array}{c} CH_2 \\ | \\ R_fSO_2N(R')RCH_2OCOCH \\ | \end{array}$$

wherein $R_f$ is a perfluoroalkyl group containing 4 to 12 carbon atoms, R is an alkylene bridging group containing 1 to 12 carbon atoms, and R' is an alkyl side group containing 1 to 6 carbon atoms.

5. Polymers having a skeletal chain containing fluorocarbon methacrylate ester units indicated by the formula:

$$\begin{array}{c} CH_2 \\ | \\ R_fSO_2N(R')RCH_2OCOC-CH_3 \\ | \end{array}$$

wherein $R_f$ is a perfluoroalkyl group containing 4 to 12 carbon atoms, R is an alkylene bridging group containing 1 to 12 carbon atoms, and R' is an alkyl side group containing 1 to 6 carbon atoms.

6. Copolymers of butadiene and the fluorocarbon esters specified in claim 1.

7. Homopolymers of the fluorocarbon esters specified in claim 1.

8. A solid flexible homopolymer of the acrylate ester of N-propyl, N-ethanol perfluorooctanesulfonamide.

9. A solid flexible homopolymer of the acrylate ester of N-butyl, N-ethanol perfluorooctanesulfonamide.

10. Stable aqueous latex dispersions of polymers of the fluorocarbon esters specified in claim 1.

11. A stable aqueous latex dispersion of a solid flexible homopolymer of the acrylate ester of N-propyl, N-ethanol perfluorooctanesulfonamide.

12. A stable aqueous latex dispersion of a solid flexible homopolymer of the acrylate ester of N-butyl, N-ethanol perfluorooctanesulfonamide.

13. Articles which have been coated or sized with solid polymers of the fluorocarbon esters specified in claim 1.

14. Fabrics which have been sized with solid flexible homopolymers of the fluorocarbon esters specified in claim 1 so as to have been rendered both water repellent and oil repellent.

15. Fabrics which have been sized with a solid flexible homopolymer of the acrylate ester of N-propyl, N-ethanol perfluorooctanesulfonamide.

16. Fabrics which have been sized with a solid flexible homopolymer of the acrylate ester of N-butyl, N-ethanol perfluorooctanesulfonamide.

No references cited.